Sept. 3, 1963   M. J. SHOEMAKER   3,102,532

SOLAR HEAT COLLECTOR MEDIA

Filed March 27, 1961

*INVENTOR.*
MILTON J. SHOEMAKER
BY

3,102,532
SOLAR HEAT COLLECTOR MEDIA
Milton J. Shoemaker, Madison, Wis., assignor to Research Products Corporation, Madison, Wis., a corporation of Wisconsin
Filed Mar. 27, 1961, Ser. No. 98,644
2 Claims. (Cl. 126—270)

This invention relates to improvements in solar heat collectors of the plate type for the conversion of radiant solar energy to heat.

The use of solar energy for heating and air conditioning is believed to be very close to being economically feasible, but although the prior art discloses many variations of solar heat collectors, for one reason or another, they have not achieved the success hoped for them in competition with other sources of locally available heat.

In simple form the plate heat collector is usually a shallow chamber with the interior surface modified, usually with a black coating, to absorb the sunlight passing through a transparent wall or cover. In order to minimize the loss of heat generated at the light absorbing surface it is customary to insulate the bottom and sides. The conventional plate collector employs a transparent fluid, usually air, to be circulated through the chamber and to carry off the generated heat. The transparent cover reduced the loss of heat by radiation and convection and, as is well-known, may consist of one or more layers of glass or plastic separated by dead air space. The fluid may be a gas, vapor or transparent liquid. Usually the temperature of the fluid is raised as it traverses the collector. If water is used as the fluid it may be subsequently utilized for general domestic and industrial purposes. On the other hand if air is employed it may be used for space heating, drying or in known ways to effect cooling and air conditioning. In general, the more nearly the light absorbing surface in a heat collector approaches a black body the more efficient will be the collector. A black body is defined as one which absorbs all the incident radiant energy (p. 2792, Handbook of Chemistry and Physics, 36th ed., 1954).

In collectors of the type known heretofore the high temperature prevailing at the black interior surface of the collector results in appreciable loss of heat by conduction through the back or bottom of the collector chamber despite the insulation. As a result it has not been possible to heat the air stream traversing a collector to nearly as high a temperature for any given flow rate per unit area as would be theoretically possible.

It is proposed to provide a solar heat collector which will more nearly approximate theoretical performance by disposing in the space of the collector chamber a mass of a material having openings therein whereby it is readily permeable to the passage of air and presenting discontinuous surfaces adapted to absorb the incident rays of the sun. The material may be slit and expanded foil, perforated or expanded sheet metal or plastic such as Teslar, metallic ribbon, wire, a suitable porous pack of metal wool, and the like having black surfaces to absorb the radiant energy penetrating the mass.

FIGURE 1 is a perspective view of a portion of one of the plurality of superposed sheets of slit and expanded foil which are preferred as the heat conversion media. The expanded sheet is a network of thin flat webs or baffles 20 forming the openings 21 the broad surfaces of the webs being twisted at various angles to the general plane of the sheet. The upper surfaces are coated with a black coating such as vinyl resin and carbon black. If desired the normally bright under side of the foil may also be coated black.

Figure 1:
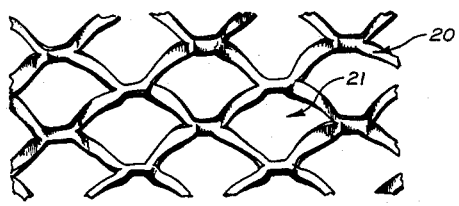
Figure 2:
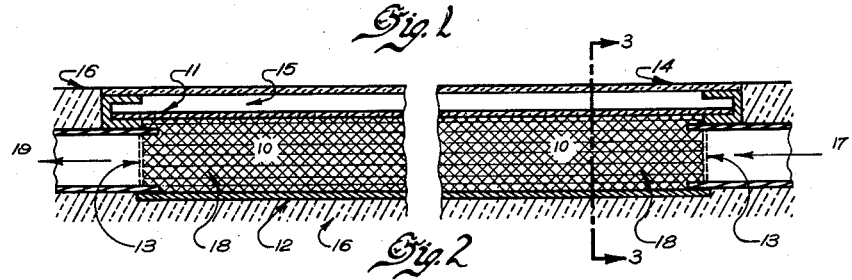
FIGURE 2 is a fragmentary side elevational view of one embodiment of the invention.

In FIGURE 2 the collector chamber 10 is defined by the inside cover glass 11, the bottom 12 and the ends 13. The outer cover glass 14 is separated by a dead air space 15 from the inner cover glass. Loss of heat is further minimized by the insulation 16. The duct 17 admits air to the mass of slit and expanded sheets of foil 18 stacked in the collector chamber. The warm air heated by its passage laterally through the stacked foil emerges at the outlet duct 19. Means to circulate air through the collector chamber are not shown.

Figure 4:
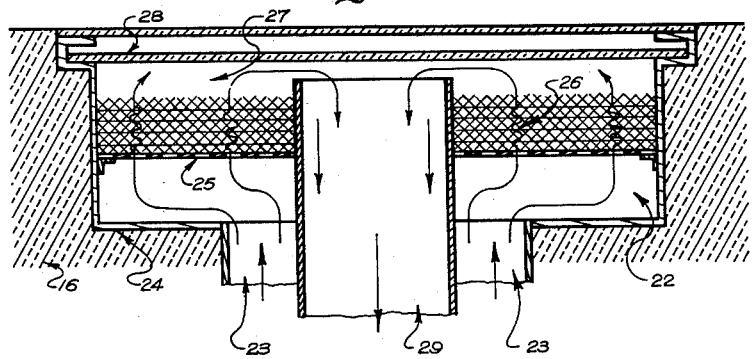
FIGURE 4 is a cross-sectional view through a modification of a collector having a plenum chamber in the bottom thereof.

In FIGURE 4 a plenum chamber 22 is used to distribute incoming air from the duct 23 along the bottom of the collector chamber 24. The air passes upward through the perforations in the supporting plate 25, through the stacked sheets of slit and expanded foil 26 where it gains sensible heat to the space 27 located between the top of the stack and the inside cover glass 28. The warm air may then be exhausted through any convenient outlet such as the concentric duct 29. Arrows indicate diagrammatically the path of the air stream.

Figure 3:
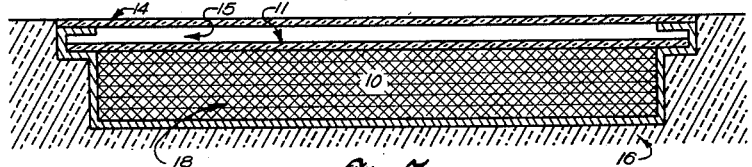
FIGURE 3 is a cross-sectional view through the collector chamber as the structure would appear in the plane 3—3 of FIGURE 2.

The collector with lateral flow illustrated in FIGURES 2 and 3 and the collector with vertical flow shown in FIGURE 4 if properly constructed are equally efficient in collecting heat. If desired the direction of air flow may be reversed in either type of collector. For extremely long collectors having lateral flow the resistance to the passage of air may under certain conditions be objectionable.

The sun's rays impinging on the black webs of the foil are converted to heat which is radiated in many directions within the mass of the stacked sheets thereby providing rapid and efficient heat transfer to the air stream passing through. The percentage of the incident radiant energy impinged on a sheet of foil may be controlled by selecting a pattern with larger or smaller openings and also by selecting webs of any desired width. Aluminum foil of 0.002" thickness of so-called full hard is sufficiently stiff to maintain its shape in a stack and is more economical than heavy sheets which could also be used. Such foil works admirably for the purpose of the invention and is well-known as a media used in the construction of air filters where low but uniform resistance to the passage of air is imperative. Due to the distortion and twist of the webs the expanded sheet may have a thickness of approximately 0.10". For the same reason when the general plane of the sheet is placed at right angles to the rays of the sun the area thereof effective in intercepting the rays is somewhat less than the actual area of the sheet. For example, a certain pattern of slit and expanded foil having an actual area of metal equal to 38.5% of the gross area intercepted 33.3% of the light normal to the general plane thereof. When stacked loosely and at random it occupied about 1% or less of the apparent volume. It is possible to readily compress the stack to ten or more times this density in which event the resistance to the passage of air would be appreciably greater. With the general plane of the sheets in a loose stack placed at right angles to the rays of the sun the following light extinction values were exhibited:

| No. of sheets of foil in the stack: | Percentage of light extinction |
|---|---|
| 1 | 33.3 |
| 2 | 50.0 |
| 3 | 63.3 |
| 4 | 73.3 |
| 5 | 80.5 |
| 6 | 86.0 |
| 7 | 90.0 |

While the use of a single sheet of slit and expanded foil in a collector chamber having a black inside bottom will result in improved performance, it is desirable to use several sheets. By using seven sheets of a commercially available pattern loosely stacked to fill the space between the inner cover glass and the bottom of the collector chamber it was found that 90% of the vertical sunlight impinged on the various sheets so that only 10% impinged on the black bottom of the chamber. With the collector turned so that the cover glass, the general plane of the foil and the bottom are at right angles to the sun's rays and with lateral air flow through the chamber, the performance was compared both with and without the foil with the results shown:

| Air flow rate, c.f.m./sq. ft. of sunlight | Temperature rise of the air in °F. emerging from collector chamber with— | |
|---|---|---|
| | (a) 7 sheets of foil | (b) with no foil |
| 1 | 140 | 89 |
| 2 | 113 | 51 |
| 3 | 92 | 38 |
| 4 | 75 | 33 |

It will be observed that for any given flow rate the temperature rise of the air is much greater in the presence of the foil.

For a collector chamber having lateral air flow unless the stack of foil sheets substantially fill the space between the inside cover glass and the bottom there will be a space below the cover glass which results in more or less air by-passing the heat conversion mass of foil. Under such a condition the performance will show some intermediate value between (a) and (b) of the table. However, with vertical air flow through the sheets of foil in the modified collector illustrated in FIGURE 4 and having a plenum chamber, the space between the inside cover glass and the mass of foil is not detrimental to the performance but is helpful in facilitating the removal of the warm air through the duct 29.

Other equivalent heat conversion media offering little resistance to the flow of air may be used in the form of a comparatively shallow mass having openings whereby incident sunlight is progressively intercepted, as it penetrates the mass thereof, by impingement upon light absorptive surfaces.

The improved results are attributed to the generation of heat on numerous surfaces distributed throughout the mass of the heat conversion media and in immediate contact with the air stream. By generating heat on discontinuous areas throughout the mass the temperature gradient and the heat lost by conduction through the bottom and sides of the collector are greatly reduced.

I claim:

1. A heat conversion mass for absorbing radiant energy as from the sun and transmitting it as heat to a fluid media, comprising a thick mass of slit and expanded metal foil having numerous irregular interconnected openings therein bounded by thin web surfaces exposed to radiation, said openings serving for the flow of a fluid media therethrough and for penetration of the mass by radiant energy from one side of the mass, and means coating the surfaces exposed to radiant energy penetrating the mass to absorb and convert the same to heat, the opposite surfaces of the material of the mass being reflective and adapted to retain radiated heat within the mass.

2. A heat conversion mass for absorbing radiant energy as from the sun and transmitting it as heat to a fluid media, comprising a plurality of sheets of slit and expanded metallic foil stacked together at random with the openings therein misaligned and interconnecting to provide for a ready flow of fluid through the mass and for penetration of the mass by the radiant energy substantially throughout the depth of the stack, and means coating the foil sheets only on the upper side for absorption of solar energy striking the mass on that side, and leaving the opposite side of said foil sheets reflective to energy radiated toward the same from coated portions of the sheets beneath whereby conversion of energy to heat is effected substantially throughout the thickness of the mass.

References Cited in the file of this patent

UNITED STATES PATENTS

| 201,439 | Moreau | Mar. 19, 1878 |
| 965,391 | Little | July 26, 1910 |
| 2,680,437 | Miller | June 8, 1954 |
| 2,930,208 | Lyman | Mar. 29, 1960 |
| 2,998,005 | Johnston | Aug. 29, 1961 |

FOREIGN PATENTS

| 1,234,792 | France | May 23, 1960 |